United States Patent Office 3,595,858
Patented July 27, 1971

3,595,858
1H-1,5-BENZODIAZEPINECARBOXAMIDE
ANTIINFLAMMATORY AGENTS
James M. McManus, Old Lyme, Conn., assignor to
Pfizer Inc.
No Drawing. Filed Oct. 21, 1969, Ser. No. 868,219
Int. Cl. C07d 53/04
U.S. Cl. 260—239.3                              9 Claims

ABSTRACT OF THE DISCLOSURE

A new class of chemotherapeutic agents, 2,3-dihydro-2-oxo-1H-1,5-benzodiazepine-3-carboxamides, possessing antiinflammatory activity.

BACKGROUND OF THE INVENTION

The disease rheumatoid arthritis, which affects 3–4% of the population, is characterized by inflammation and pain of joints. Although the etiology of rheumatoid arthritis is unknown, bed rest and steroid therapy have been employed to alleviate the symptoms. Recently, non-steroidal anti-inflammatory agents have been shown to be useful in the treatment of this disease. It is to this latter class of chemotherapeutic agents that the compounds of this invention, namely, 2,3-dihydro-2-oxo-1H-1,5-benzodiazepine-3-carboxamides, relates.

Compounds of the present invention are synthesized by isocyanation of the appropriately substituted 2,3-dihydro-2-oxo-1H-1,5-benzodiazepine with the requisite arylisocyanate.

SUMMARY OF THE INVENTION

The novel anti-inflammatory agents of this invention are 2,3-dihydro-2-oxo-1H-1,5-benzodiazepine - 3 - carboxamides of the formula:

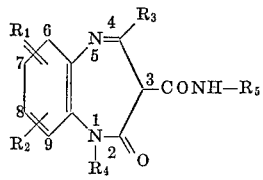

and the basic metal salts thereof, wherein $R_1$ and $R_2$ are each a member selected from the group consisting of hydrogen, alkyl having up to 3 carbon atoms, fluorine, chlorine, bromine, and alkoxy and alkylthio each having up to 2 carbon atoms. $R_3$ and $R_4$ are each selected from the group consisting of hydrogen, and alkyl and alkenyl each containing up to 4 carbon atoms. $R_5$ is a member selected from the group consisting of phenyl and substituted phenyl, wherein said substituents are selected from the group consisting of fluorine, chlorine, bromine, alkyl having up to 2 carbon atoms, alkoxy and alkylthio each having up to 2 carbon atoms, trifluoromethyl and trifluoromethoxy.

Of particular interest are congeners wherein $R_1$ and $R_2$ are selected from the group consisting of hydrogen, chlorine, bromine and methoxy, $R_3$ and $R_4$ are either hydrogen or lower alkyl up to 2 carbon atoms and $R_5$ is phenyl or substituted phenyl, wherein said substituents are selected from the group consisting of fluorine, chlorine, bromine, alkyl containing up to 3 carbon atoms, alkoxy and alkylthio each having up to 2 carbon atoms, trifluoromethyl and trifluoromethoxy.

DETAILED DESCRIPTION OF THE INVENTION

The process employed for the preparation of the novel compounds of this invention consists of the interaction of an appropriately substituted 2,3-dihydro-2-oxo-1H-1,5-benzodiazepine with a requisite phenylisocyanate as follows:

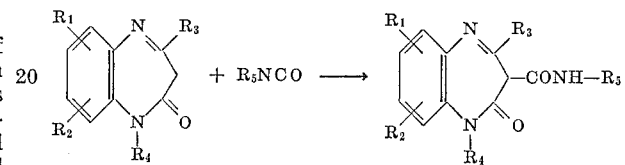

$R_1$, $R_2$, $R_3$, $R_4$, and $R_5$ are all defined as previously indicated.

The reaction leading to the products of the instant invention is carried out in a reaction-inert solvent such as tetrahydrofuran, dimethylsulfoxide, dimethylformamide or hexamethylphosphoramide, in the presence of a tertiary organic amine. In practice the isocyanate is added dropwise to a solution or suspension of the appropriately substituted 2,3-dihydro-2-oxo-1H-1,5-benzodiazepine and a tertiary amine, such as triethylamine, in one of the aforesaid solvents. It is usually preferable to employ about a molar equivalent of the isocyanate reagent, with best results often being achieved by using just a slight excess of same. Catalytic amounts of the tertiary amine may be employed, although it is preferred that equimolar amounts be used. It is normally found convenient to employ elevated temperatures in almost every case so as to reduce reaction time, which may range from a few minutes to 48 hours, depending on the reactivity of the starting reagents. Upon completion of the isocyanation reaction the product is isolated either by cooling the reaction mixture and filtering the precipitate or alternately, by adding the mixture to an excess of ice-water, treating with sufficient acid, such as hydrochloric acid, to provide a pH of between 4 and 5, and filtering the resulting solids.

The 2,3-dihydro-2-oxo-1H-1,5-benzodiazepine starting reagents of this invention may be obtained commercially or are readily available to those skilled in the art. For instance, the synthesis of 2,3-dihydro-2-oxo-4-methyl-1H-1,5-benzodiazepine is described by W. A. Sexton, Journal of the Chemical Society, p. 303 (1942). The appropriately substituted phenylisocyanates, too, are commercially available or may be prepared by standard organic procedures known to those skilled in the art, for instance, Zook and Wagner, Synthetic Organic Chemistry, John Wiley and Sons, Inc., New York, 1956, p. 640.

It is noted that a common characteristic of many non-steroidal anti-inflammatory agents is that they are acidic in nature. Each of the 3-carboxanilides of the instant invention shares this property and is an effective proton source, with the active hydrogen at the 3-position.

Pharmaceutically acceptable, basic salts of the compounds of the present invention are also therapeutic agents, wherein the cations of said salts include the ammonium, sodium and potassium ions. The pharmaceutically acceptable salts of the compounds described herein are prepared by conventional procedures, as for example, by adding the acid to an aqueous solution containing an equivalent amount of a pharmaceutically acceptable base, i.e., a base containing one of the above cations, followed by concentration of the resultant mixture to obtain the desired product. The bases may be selected from the hydroxides, oxides and carbonates.

Pharmaceutically unacceptable, basic metal salts of the compounds of the present invention, wherein the cations of said salts include barium, strontium, cesium and rubidium are also prepared by the aforementioned procedure. While said salts are not useful therapeutic agents per se, they are avaluable in the purification of the compounds of the present invention and in the preparation of pharmaceutically acceptable salts.

As indicated hereinbefore, the 2,3-dihydro-2-oxo-1H-1,5-benzodiazepine-3-carboxanilides and the pharmaceutically acceptable salts thereof are useful antiflammatory agents. These compounds are of value in alleviating swelling and inflammation which are symptomatic of rheumatoid arthritis and related disorders which are responsive to treatment with antiinflammatory agents. Either as individual therapeutic agents or as mixtures of therapeutic agents, they may be administered alone, but are generally administered with a pharmaceutical carrier selected on the basis of the chosen route of administration and standard pharmaceutical practice. For example, they may be administered orally in the form of tablets or capsules containing such excipients as starch, milk sugar or certain types of clay, etc. They may be administered orally in the form of elixirs or oral suspensions with the active ingredients combined with emulsifying and/or suspending agents. They may be injected parenterally, and for this use they, or appropriate derivatives, may be prepared in the form of sterile aqueous solutions. Such aqueous solutions should be suitably buffered, if necessary, and should contain other solutes such as saline or glucose to render them isotonic.

The dosage required to reduce inflammation or swelling in arthritic subjects would be determined by the nature and extent of the symptoms. Generally, small doses will be administered initially, with a gradual increase in the dosage until the optimum level is determined. It will generally be found that when the composition is administered orally, larger quantities of the active ingredient will be required to produce the same level as produced by a small quantity administered parenterally. In general, from about 10 to about 300 mg. of active ingredient per kilogram of body weight, administered in single or multiple dose units, will effectively reduced inflammation and swelling.

Particularly effective an antiinflammatory agents are analogs wherein $R_1$ and $R_2$ are each selected from the group consisting of hydrogen, chlorine, bromine and methoxy, $R_3$ and $R_4$ are either hydrogen or lower alkyl up to 2 carbon atoms and $R_5$ is phenyl or substituted phenyl, wherein said substituents are selected from the group consisting of fluorine, chlorine, bromine, alkyl containing up to 3 carbon atoms, alkoxy and alkylthio each having up to 2 carbon atoms, trifluoromethyl and trifluoromethoxy. Among these compounds, 4' - chloro - 2,3-dihydro-2-oxo-4-methyl-1H-1,5 - benzodiazepine - 3 - carboxanilide, 4'-bromo-2,3-dihydro - 2 - oxo - 1,4-dimethyl-1H-1,5-benzodiazepine-3-carboxanilide, 2,3 - dihydro - 2 - oxo-1,4-dimethyl-7,8-dichloro - 1H - 1,5 - benzodiazepine-3-carboxanilide, 2',4'-difluoro - 2,3 - dihydro - 2-oxo-1-methyl-7-methoxy-1H-1,5 - benzodiazepine - 3 - carboxanilide and 4'-chloro-2,3-dihydro - 2 - oxo - 1 - ethyl-4-methyl-7-bromo-1H-1,5-benzodiazepine-3-carboxanilide are preferred.

A standard procedure for detecting and comparing antiinflammatory activity of compounds is the carrageenin rat foot edema test, whereby unanesthetized adult male albino rats of 150–190 g. body weight are each numbered, weighed and marked with ink on the right lateral malleolus. One hour after administration of the drug by gavage, edema is induced by injection of 0.05 ml. of 1% solution of carrageenin into the plantar tissue of the marked paws. Immediately thereafter, the volume of the injected paw is measured. The increase in volume three hours after the injection of carrageenin constitutes the individual response. Compounds are considered active if the difference in response between a control and the drug being tested is significant. Standard compounds are phenylbutazone at 33 mg./kg. and acetylsalicylic acid at 100 mg./kg., both with oral administration.

The following examples are given to more fully illustrate the instant invention. They are not the only possible embodiments of the invention and are not to be considered as a limitation on the scope thereof.

Example I.—4'methoxy-2,3-dihydro-2-oxo-4-methyl-1H-1,5-benodiazepine-3-carboxanilide To a suspension of 1.74 g. (0.01 mole) of 2,3-dihydro-4-methyl-2-oxo-1H-1,5-benzodiazepine in 8 ml. of tetrahydrofuran is added 1.64 g. (0.011 mole) of 4-methoxyphenylisocyanate, followed by the addition of 4 drops of triethylamine. The resulting mixture is heated to the reflux temperature for 48 hours, after which it is cooled and the resulting precipitate filtered, 2.9 g., M.P. 131–133° C. Recrystallization from diisopropylether provides the purified product, M.P. 131–132° C.

Analysis.—Calcd. for $C_{18}H_{17}N_3O_3$ (percent): C, 66.86; H, 5.30; N, 13.00. Found (percent): C, 66.77; H, 5.51; N, 13.03.

Example II

The procedure of Example I is repeated, using equivalent amounts of appropriately substituted starting materials, to produce the following congeners:

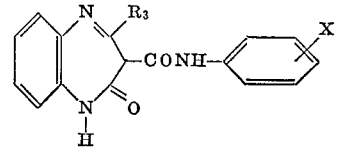

| $R_3$: | X |
|---|---|
| $CH_3$ | 2'-$OCH_3$ |
| $CH_3$ | 3'-$OCH_3$ |
| $CH_3$ | 4'-$OCH_3$ |
| $CH_3$ | 2',4'-$(OCH_3)_2$ |
| $CH_3$ | 3',4'-$(OCH_3)_2$ |
| $CH_3$ | 3'-$OC_2H_5$ |
| $CH_3$ | 4'-$OC_2H_5$ |
| $C_2H_5$ | 3'-$OCH_3$ |
| $C_2H_5$ | 4'-$OCH_3$ |
| $C_2H_5$ | 4'-$OC_2H_5$ |
| n-$C_3H_7$ | 2'-$OCH_3$ |
| n-$C_3H_7$ | 4'-$OCH_3$ |
| n-$C_3H_7$ | 3',4'-$(OCH_3)_2$ |
| n-$C_3H_7$ | 4'-$OC_2H_5$ |
| i-$C_3H_7$ | 3'-$OCH_3$ |
| i-$C_3H_7$ | 4'-$OCH_3$ |
| n-$C_4H_9$ | 4'-$OCH_3$ |
| n-$C_4H_9$ | 4'-$OC_2H_5$ |
| t-$C_4H_9$ | 4'-$OCH_3$ |
| i-$C_4H_9$ | 4'-$OC_2H_5$ |
| s-$C_4H_9$ | 3'-$OCH_3$ |

Example III

The procedure of Example I is again repeated, using equivalent amounts of appropriately substituted substrates, to produce the following compounds:

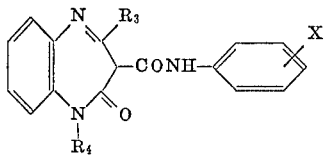

| R₃ | R₄ | X |
|---|---|---|
| CH₃ | H | 2'-SCH₃ |
| CH₃ | CH₃ | 3'-SCH₃ |
| CH₃ | C₂H₅ | 2'-SCH₃ |
| CH₃ | CH₃ | 4'-SCH₃ |
| C₂H₅ | CH₃ | 2'-SCH₃ |
| C₂H₅ | C₂H₅ | 3'-SCH₃ |
| C₂H₅ | C₂H₅ | 4'-SC₂H₅ |
| C₂H₅ | H | 4'-SCH₃ |
| i-C₃H₇ | CH₃ | 2'-SCH₃ |
| i-C₃H₇ | C₂H₅ | 4'-SCH₃ |
| i-C₃H₇ | n-C₃H₇ | 4'-SCH₃ |
| n-C₃H₇ | n-C₃H₇ | 3'-SCH₃ |
| n-C₄H₉ | C₂H₅ | 3',4'-(SCH₃)₂ |
| t-C₄H₉ | n-C₃H₇ | 4'-SC₂H₅ |
| s-C₄H₉ | n-C₄H₉ | 3'-SCH₃ |
| i-C₄H₉ | CH₃ | 2'-SCH₃ |

Example IV.—4'-chloro-2,3-dihydro-2-oxo-4-methyl-1H-1,5-benzodiazepine-3-carboxanilide A mixture of 1.74 g. (0.01 mole) of 2,3-dihydro-2-oxo-4-methyl-1H-1,5-benzodiazepine, 1.69 g. (0.011 mole) of 4-chlorophenylisocyanate and 4 drops of triethylamine in 10 ml. of tetrahydrofuran is heated to reflux overnight. The reaction mixture is cooled, filtered and the solids washed with diisopropylether, 2.9 g., M.P. 162–163° C.

Analysis.—Calcd. for $C_{17}H_{14}ClN_3O_2$ (percent): C, 62.29; H, 4.30; N, 12.82. Found (percent); C, 62.40; H, 4.29; N, 12.68.

Example V

The procedure of Example IV is repeated, using equivalent amounts of appropriately substituted reactants, to provide the following products:

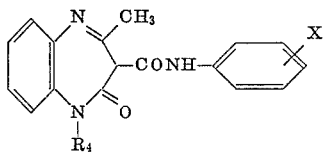

| R₄ | X |
|---|---|
| H | 2'-Cl |
| H | 3'-Cl |
| H | 2',4'-Cl₂ |
| H | 3',4'-Cl₂ |
| CH₃ | 2'-Cl |
| CH₃ | 3'-Cl |
| CH₃ | 4'-Cl |
| CH₃ | 2',4'-Cl₂ |
| H | 2'-Br |
| H | 4'-Br |
| CH₃ | 3'-Br |
| CH₃ | 4'-Br |
| H | 2'-F |
| H | 4'-F |
| CH₃ | 2'-F |
| CH₃ | 4'-F |
| CH₃ | 2',4'-F₂ |
| CH₃ | 2',5'-F₂ |

Example VI.—2,3-dihydro-2-oxo-4,7,8-trimethyl-1H-1,5-benzodiazepine-3-carboxanilide A reaction mixture containing 1.01 g. (5 mmole) of 2,3-dihydro-2-oxo-4,7,8-trimethyl-1H-1,5-benzodiazepine, 659 mg. (5.5 mole) of phenylisocyanate and 3 drops of triethylamine in 7 ml. of tetrahydrofuran is heated at steam bath temperatures overnight. The resulting solution is cooled, and the precipitate which forms is filtered and dried, 200 mg., M.P. 247° C. with decomposition. Purification is effected by recrystallization from tetrahydrofuran, M.P. 255° C. with decomposition.

Analysis.—Calcd. for $C_{19}H_{19}N_3O_2$ (percent): C, 71.01; H, 5.96; N, 13.07. Found (percent): C, 70.74; H, 5.31; N, 12.87.

Example VII

The procedure described in Example VI is repeated, using other starting materials and reagents in place of those specifically mentioned, to provide the following compounds:

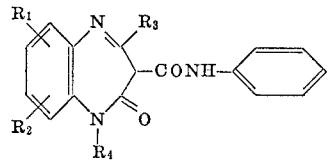

| R₁ | R₂ | R₄ |
|---|---|---|
| 6-CH₃ | H | H |
| 6-CH₃ | 8-CH₃ | CH₃ |
| 7-CH₃ | H | CH₃ |
| 7-CH₃ | 8-CH₃ | C₂H₅ |
| 7-CH₃ | 9-CH₃ | CH₃ |
| 8-CH₃ | H | CH₃ |
| 8-CH₃ | 9-CH₃ | C₂H₅ |
| 9-CH₃ | H | CH₃ |

Example VIII

The procedure in Example VI is repeated again, using equivalent amounts of appropriately substituted starting materials, to provide the following products:

| R₁ | R₂ | R₃ | R₄ |
|---|---|---|---|
| 6-Cl | H | H | H |
| 7-Cl | H | CH₃ | H |
| 7-Cl | H | CH₃ | CH₃ |
| 8-Cl | H | CH₃ | C₂H₅ |
| 6-Cl | 7-Cl | H | H |
| 6-Cl | 7-Cl | CH₃ | H |
| 7-Cl | 8-Cl | CH₃ | CH₃ |
| 7-Cl | 9-Cl | C₂H₅ | CH₃ |
| 8-Cl | 9-Cl | CH₃ | CH₃ |
| 9-Cl | H | C₂H₅ | C₂H₅ |

Example IX.—4'-trifluoromethoxy-2,3-dihydro-2-oxo-4-methyl-1H-1,5-benzodiazepine-3-carboxanilide A suspension of 2.23 g. (0.011 mole) of 4-trifluoromethoxyphenylisocyanate, 1.75 g. (0.01 mole) of 2,3-dihydro-2-oxo-4-methyl-1H-1,5-benzodiazepine and 4-drops of triethylamine in 10 ml. of tetrahydrofuran is heated to steam bath temperatures overnight, during which time the solids dissolve. The resulting solution is cooled, and the precipitated solids are collected by filtration and dried, 749 mg., M.P. 125–126° C. Recrystallization from diisopropylether gives the pure product, M.P. 125.5–126.5° C.

Analysis.—Calcd. for $C_{18}H_{14}F_3N_3O_3$ (percent): C, 57.30; H, 3.74; N, 11.14. Found (percent): C, 57.08; H, 3.65; N, 11.08.

Example X

Employing the procedures of Example IX, and using equivalent amounts of the appropriate starting material and reagents, the following products were synthesized:

2'-trifluoromethoxy-1,4-dimethyl-2,3-dihydro-2-oxo-1H-1,5-benzodiazepine-3-carboxanilide 3'-trifluoromethoxy-1-ethyl-2,3-dihydro-2-oxo-1H-1,5-benzodiazepine-3-carboxanilide 4'-trifluoromethoxy-1-methyl-2,3-dihydro-2-oxo-
  1H-1,5-benzodiazepine-3-carboxanilide
2'-trifluoromethyl-1-methyl-2,3-dihydro-4-ethyl-
  2-oxo-1H-1,5-benzodiazepine-3-carboxanilide
3.-trifluoromethyl-2,3-dihydro-2-oxo-1H-1,5-
  benzodiazepine-3-carboxanilide
4'-trifluoromethyl-1-methyl-2,3-dihydro-2-oxo-1H-
  1,5-benzodiazepine-3-carboxanilide
4'-trifluoromethyl-1,4-dimethyl-2,3-dihydro-2-oxo-
  1H-1,5-benzodiazepine-3-carboxanilide
4'-trifluoromethoxy-1-n-propyl-2,3-dihydro-4-methyl
  2-oxo-1H-1,5-benzodiazepine-3-carboxanilide Example XI The procedure of Example I is again repeated, using equivalent amounts of appropriately substituted substrates, to produce the following compounds:

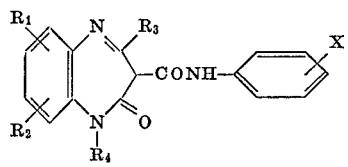

| $R_1$ | $R_2$ | $R_3$ | $R_4$ | X |
|---|---|---|---|---|
| 6-OCH$_3$ | H | CH$_3$ | H | 2',4'-F$_2$ |
| 6-OCH$_3$ | H | H | CH$_3$ | 2',4'-F$_2$ |
| 7-OCH$_3$ | H | CH$_3$ | C$_2$H$_5$ | H |
| 7-OCH$_3$ | H | CH$_3$ | CH$_3$ | 4'-Cl |
| 7-OCH$_3$ | 8-OCH$_3$ | H | CH$_3$ | 2',4'-F$_2$ |
| 7-OCH$_3$ | 8-OCH$_3$ | CH$_3$ | CH$_3$ | 3'-F |
| H | 8-OCH$_3$ | H | C$_2$H$_5$ | 3,4'-Cl$_2$ |
| H | 8-OCH$_3$ | H | CH$_3$ | 4'-Cl |
| H | 8-OCH$_3$ | CH$_3$ | CH$_3$ | H |
| 8-OCH$_3$ | 9-OCH$_3$ | CH$_3$ | CH$_3$ | 4'-Br |

Example XII

The procedure of Example I again is repeated, using equivalent amounts of suitably substituted starting materials and reagents, to provide the following final products:

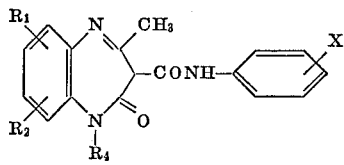

| $R_1$ | $R_2$ | $R_4$ | X |
|---|---|---|---|
| 6-Br | H | H | 4'-Cl |
| 6-Br | H | CH$_3$ | 4'-Cl |
| 6-Br | H | C$_2$H$_5$ | 2',4'-F$_2$ |
| 6-Br | H | C$_2$H$_5$ | 4'-OCH$_3$ |
| 7-Br | H | CH$_3$ | 4'-Cl |
| 7-Br | H | C$_2$H$_5$ | 3'-Cl |
| 7-Br | H | H | 4'-Cl |
| 7-Br | 8-Br | H | 4'-OCH$_3$ |
| H | 8-Br | H | 4'-Br |
| H | 8-Br | CH$_3$ | 4'-Cl |
| H | 8-Br | C$_2$H$_5$ | 2',4'-Cl$_2$ |
| H | 8-Br | C$_2$H$_5$ | 2',4'-F$_2$ |

Example XIII.—Sodium 1-methyl-2,3-dihydro-7,8-dichloro-2-oxo-1H-1,5-benzodiazepine-3-carboxanilide To a methanol solution of 1-methyl-2,3-dihydro-7,8-dichloro - 2 - oxo   1H - 1,5 - benzodiazepine - 3 - carboxanilide is added an equivalent amount of sodium hydroxide in a minimum volume of the same solvent. The resulting solution is concentrated to dryness in vacuo or by freeze drying. The resulting amorphous sodium salt is triturated with pentane, and filtered.

In like manner, the potassium and lithium salts are also prepared as are the alkali metal salts of all other acidic 2,3 - dihydro - 2 - oxo - 1H - 1,5 - benzodiazepine-3-carboxanilides, which are reported in the preceeding examples.

Example XIV.—Purification of 2,3 - dihydro - 2 - oxo-4 - methyl - 1H - 1,5 - benzodiazepine - 3 - carboxanilide via the barium salt To a methanol solution of 2.9 g. (0.01 mole) of crude 2,3 - dihydro - 2 - oxo - 4 - methyl - 1H - 1,5 - benzodiazepine-3-carboxanilide is added 1.57 g. (0.005 mole) of barium hydeoxide octahydrate dissolved in a minimum amount of methanol-water. The resulting suspension is concentrated to dryness under reduced pressure, and the residue is washed several times with ethanol. The solids are added to 50 ml. of water, and sufficient 6 N hydrochloric acid added to bring the suspuension to pH 3. The purified product is filtered and dried.

Example XV

Each of the following 2,3 - dihydro - 2 - oxo - 1H-1,5 - benzodiazepine - 3 - carboxanilides were tested for antiinflammatory activity using the aforementioned carrageenin rat foot edema test, and were found to be active at the indicated dose level:

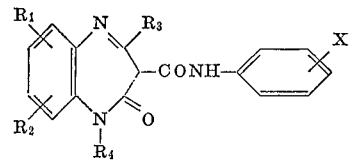

| $R_1$ | $R_2$ | $R_3$ | $R_4$ | X | Dose, mg./kg. |
|---|---|---|---|---|---|
| H | H | CH$_3$ | H | 2'-Cl | 100 |
| H | H | CH$_3$ | H | 3'-Cl | 100 |
| H | H | CH$_3$ | H | 2'-CH$_3$ | 33 |
| H | H | CH$_3$ | H | 3'-CH$_3$ | 33 |
| 7-CH$_3$ | 8-CH$_3$ | CH$_3$ | H | H | 33 |
| H | H | CH$_3$ | H | 4'-OCH$_3$ | 33 |

What is claimed is:

1. A compound selected from those of the formula:

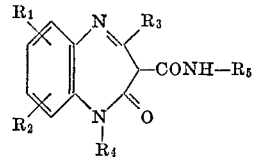

and the barium, strontium, ammonium and alkali metal salts thereof, wherein:

$R_1$ and $R_2$ are each selected from the group consisting of hydrogen, alkyl containing up to 3 carbon atoms, fluorine, chlorine, bromine and alkoxy and alkylthio each of up to 2 carbon atoms.

$R_3$ and $R_4$ are each selected from the group consisting of hydrogen and alkyl and alkenyl each containing up to 4 carbon atoms.

$R_5$ is selected from the group consisting of phenyl and substituted phenyl, said substituents being selected from the group consisting of fluorine, chlorine, bromine, alkyl containing up to 3 carbon atoms, alkoxy and alkylthio each having up to 2 carbon atoms, trifluoromethyl and trifluoromethoxy.

2. The compound of claim 1 wherein $R_1$, $R_2$ and $R_4$ are hydrogen, $R_3$ is alkyl containing up to 4 carbon atoms.

3. The compound of claim 1 wherein $R_1$ and $R_2$ are hydrogen, $R_3$ is methyl and $R_4$ is alkyl containing up to 4 carbon atoms.

4. The compound of claim 1 wherein $R_1$ is chloro, $R_3$ and $R_4$ are methyl and $R_5$ is phenyl.

5. The compound of claim 1 wherein $R_1$ is methoxy, $R_3$ is hydrogen, $R_4$ is methyl and $R_5$ is 2',4'-difluorophenyl.

6. The compound of claim 1 wherein $R_1$ is bromine, $R_3$ is alkyl, $R_4$ is ethyl and $R_5$ is 4'-chlorophenyl.

7. 4' - chloro - 2,3 - dihydro - 2 - oxo - 4 - methyl-1H-1,5-benzodiazepine-3-carboxanilide.

8. 4' - bromo - 2,3 - dihydro - 2 - oxo - 1,4 - dimethyl-1H-1,5-benzodiazepine-3-carboxanilide.

9. 2,3 - dihydro - 2 - oxo - 1,4 - dimethyl - 7,8 - dichloro-1H-1,5-benzodiazepine-3-carboxanilide.

References Cited

UNITED STATES PATENTS 3,075,967    1/1963    Krapcho _____ 260—239.3

HENRY R. JILES, Primary Examiner

R. T. BOND, Assistant Examiner

U.S. Cl. X.R.

424—244